(12) United States Patent
Zemany et al.

(10) Patent No.: US 11,733,367 B1
(45) Date of Patent: Aug. 22, 2023

(54) CHROMATIC CORRELATION INTERFEROMETRY DIRECTION FINDING

(71) Applicant: BAE SYSTEMS Information and Electronic Systems Integration Inc., Nashua, NH (US)

(72) Inventors: Paul D. Zemany, Amherst, NH (US); David P. Charette, Hudson, NH (US); Matthew F. Chrobak, Groton, MA (US); Court E. Rossman, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 220 days.

(21) Appl. No.: 17/230,011

(22) Filed: Apr. 14, 2021

(51) Int. Cl.
*G01S 13/42* (2006.01)
*F41G 7/22* (2006.01)

(52) U.S. Cl.
CPC ............ *G01S 13/42* (2013.01); *F41G 7/2246* (2013.01); *F41G 7/2286* (2013.01)

(58) Field of Classification Search
CPC ....... G01S 13/42; F41G 7/2246; F41G 7/2286
See application file for complete search history.

(56) References Cited

U.S. PATENT DOCUMENTS

| | | | |
|---|---|---|---|
| 6,822,583 B2 | 11/2004 | Yannone et al. | |
| 7,133,887 B2 | 11/2006 | Sirois | |
| 7,233,285 B2 | 6/2007 | Struckman | |
| 7,268,728 B1 * | 9/2007 | Struckman | G01S 5/04 342/451 |
| 7,436,351 B2 | 10/2008 | Struckman et al. | |
| 11,496,500 B2 * | 11/2022 | Ahn | H04L 63/12 |
| 2006/0227050 A1 * | 10/2006 | Vaughn | G01S 3/74 342/444 |
| 2007/0075891 A1 * | 4/2007 | Sajima | G01S 13/87 342/107 |
| 2007/0273576 A1 * | 11/2007 | Struckman | G01S 3/146 342/146 |
| 2018/0172794 A1 * | 6/2018 | Rossman | G01S 3/74 |
| 2020/0225311 A1 * | 7/2020 | Slocum | F41G 7/2233 |

* cited by examiner

*Primary Examiner* — Marcus E Windrich
(74) *Attorney, Agent, or Firm* — KPIP Law, PLLC; Scott J. Asmus

(57) ABSTRACT

The system and method for chromatic correlation interferometry direction finding (CIDF) used to resolve ambiguities. Ambiguities are overcome by correlating over a range of frequencies. In some cases, multiple (i.e., 2 or more) frequencies or a continuous range of frequencies are used to make a more robust correlation manifold. As the complex response manifold is frequency dependent, using a set of two or more manifolds provides a significant reduction of false peaks.

17 Claims, 6 Drawing Sheets

CHROMATIC CORRELATION INTERFEROMETRY DIRECTION FINDING

FIELD OF THE DISCLOSURE

The present disclosure relates to a radio frequency (RF) sensor that provides target information for missile guidance and target tracking and more particularly to the use of chromatic correlation interferometry direction finding for missile guidance or other applications that involve sensing object location.

BACKGROUND OF THE DISCLOSURE

Correlation interferometry direction finding (CIDF) is a form of direction finding (DF) that forms a correlation map (also called a heat map) by cross correlating a set of measured array voltage vectors with sets of testing array voltage vectors. Direction finding is the measurement of the direction from which a received signal was transmitted or reflected from an object of interest. This can refer to radio waves or other signals, including radar signals. Direction finding may be used in navigation, to locate friendly transmitters, and to locate adversarial or interfering transmitters or objects that reflect RF energy. To estimate a DF bearing, a numerical correlation comparison is computed, comparing measured vectors to testing vectors (e.g., calibration or array manifold), where the testing vectors are scanned through angular sectors of interest.

The resultant CIDF correlation equation from Applicant's own work is:

$$|R(\theta^t, \phi^t)|^2 = \frac{\left|\sum_1^{na} U_n A_n^*(\theta^t, \phi^t)\right|^2}{\left(\sum_1^{na}|U_n|^2\right)\left(\sum_1^{na}|A_n(\theta^t, \phi^t)|^2\right)}$$

where:

$|R(\theta^t, \phi^t)|^2$ Is the correlation squared function computed at testing angles $(\theta^t, \phi^t)$ $U_n$ Antenna voltages measured on a signal that is incident on the DF array $A_n(\theta^t, \phi^t)$ Array vectors retrieved from a calibration manifold na number of DF antennas Applicant's CIDF method above computes $R^2$ where the peaks in $R^2$ relate to the locations (direction) of RF sources (DF bearings). A CIDF method is of benefit when an antenna pattern is complicated and non-ideal. The antennas on a missile body or an airplane are examples of this. However, it is often the case that $R^2$ has false peaks.

A monopulse method is often used to estimate target bearing angles. This method requires that the response patterns of the antenna elements be smooth and well behaved. For many platforms, physical constraints prevent or limit the ability to form effective monopulse arrays. These limitations produce grating lobes and complex pattern shapes. This is particularly true for missiles that must satisfy aerodynamic constraints and thus limit the shape and placement of antenna elements. In other cases, platforms are subject to multipath from reflections from features on the platform itself. This effect limits the use and accuracy of monopulse methods.

CIDF was developed to address and even exploit the issues caused by the complex pattern responses of various antenna elements. However, it is still possible to have wild bearings. By using frequency diversity in CIDF, as described herein, the wild bearing issue can be resolved. Wherefore it is an object of the present disclosure to overcome the above-mentioned shortcomings and drawbacks associated with the conventional direction finding.

SUMMARY OF THE DISCLOSURE

One aspect of the present disclosure is a system for chromatic correlation interferometry direction finding (CIDF), comprising: a transmitter configured to transmit signals at two or more frequencies; a set of two or more antenna elements for receiving signals; signaling hardware configured to form I and Q data from received signals; a processor to control the signaling hardware and execute chromatic CIDF algorithms; and a pre-measured or pre-calibrated response manifold, or data table, for use in comparing with the received signals.

One embodiment of the system is wherein the signals are radar signals. In some cases, the radar signals are time of flight.

Another embodiment of the system is wherein the chromatic CIDF algorithm is:

$$|R(\theta^t, \phi^t)|^2 = \frac{\left|\sum_1^{na} U_n A_n^*(\theta^t, \phi^t)\right|^2}{\left(\sum_1^{na}|U_n|^2\right)\left(\sum_1^{na}|A_n(\theta^t, \phi^t)|^2\right)}$$

where:

$|R(\theta^t, \phi^t)|^2$ Is the correlation squared function computed at testing angles $(\theta^t, \phi^t)$ $U_n$ Antenna voltages measured on a signal that is incident on the DF array $A_n(\theta^t, \phi^t)$ Array vectors retrieved from a calibration manifold na number of DF antennas wherein the term $A_n(\theta^t, \phi^t)$ and $U_n$ are summed over frequency as well and become $A_{n,f}(\theta^t, \phi^t)$ and $U_{n,f}$ and the sum is over elements (n) and frequencies (f).

Yet another embodiment of the system is wherein the chromatic CIDF algorithm can be applied to single polarization, and single line of bearing solutions and to arbitrary polarization and single line of bearing in polarization sensitive bands.

Still yet another embodiment of the system is wherein the chromatic CIDF algorithm can be applied to multiple frequencies and active radar for super resolution techniques, including, single polarization, and multiple line of bearing solutions, or arbitrary polarization, and multiple line of bearing solutions with signal separation capabilities determined by SNR and array bandwidth.

Another aspect of the present disclosure is a method for chromatic correlation interferometry direction finding (CIDF), comprising: illuminating an area of interest using signals at two or more different frequencies; receiving signals at two or more different frequencies reflected off the area of interest; down converting the received signals to form I and Q data that define complex antenna voltages; computing values for each of $N_a$ antenna apertures ($N_a \geq 2$) and for each of $N_f$ frequency values ($N_f \geq 2$); correlating $N_f \times N_a$ complex antenna voltages with a pre-calibrated or pre-measured response manifold, where the pre-calibrated or pre-measured response manifold provides peaks that represent target bearings or angles of arrival; and providing the target bearings or angles of arrival to a guidance computer.

One embodiment of the method further comprises using changes in an array pattern as a function of a frequency response to resolve ambiguous peaks that are present in the array pattern of a single frequency.

Another embodiment of the method is wherein the signals are radar signals. In some cases, the radar signals are time of flight. In certain embodiments, the radar has increased resolution direction finding and decreased sidelobes. In some cases, the radar provides a range to target in addition to target bearing angles.

Yet another embodiment of the method is wherein the chromatic CIDF algorithm is:

$$|R(\theta^t, \phi^t)|^2 = \frac{\left|\sum_1^{na} U_n A_n^*(\theta^t, \phi^t)\right|^2}{\left(\sum_1^{na}|U_n|^2\right)\left(\sum_1^{na}|A_n(\theta^t, \phi^t)|^2\right)}$$

where:
$|R(\theta^t, \phi^t)|^2$ Is the correlation squared function computed at testing angles $(\theta^t, \phi^t)$
$U_n$ Antenna voltages measured on a signal that is incident on the DF array
$A_n(\theta^t, \phi^t)$ Array vectors retrieved from a calibration manifold
na number of DF antennas
wherein the term $A_n(\theta^t, \phi^t)$ and $U_n$ are summed over frequency as well and become $A_{n,f}(\theta^t, \phi^t)$ and $U_{n,f}$ and the sum is over elements (n) and frequencies (f).

Still yet another embodiment of the method is wherein the chromatic CIDF algorithm can be applied to single polarization, and single line of bearing solutions and to arbitrary polarization and single line of bearing in polarization sensitive bands. In certain embodiments, the chromatic CIDF algorithm can be applied to multiple frequencies and active radar for super resolution techniques, including, single polarization, and multiple line of bearing solutions, or arbitrary polarization, and multiple line of bearing solutions with signal separation capabilities determined by SNR and array bandwidth.

Yet another aspect of the present disclosure is a method for chromatic correlation interferometry direction finding (CIDF), comprising: receiving signals at two or more different frequencies reflected off an area of interest; down converting the received signals to form I and Q data that define complex antenna voltages; computing values for each of $N_a$ antenna apertures ($N_a \geq 2$) and for each of $N_f$ frequency values ($N_f \geq 2$); correlating $N_f \times N_a$ complex antenna voltages with a pre-calibrated or pre-measured response manifold, where the pre-calibrated or pre-measured response manifold provides peaks that represent target bearings or angles of arrival; and providing the target bearings or angles of arrival to a guidance computer.

One embodiment of the method is wherein the signals are radar signals.

Another embodiment of the method is wherein the chromatic CIDF algorithm is:

$$|R(\theta^t, \phi^t)|^2 = \frac{\left|\sum_1^{na} U_n A_n^*(\theta^t, \phi^t)\right|^2}{\left(\sum_1^{na}|U_n|^2\right)\left(\sum_1^{na}|A_n(\theta^t, \phi^t)|^2\right)}$$

where:
$|R(\theta^t, \phi^t)|^2$ Is the correlation squared function computed at testing angles $(\theta^t, \phi^t)$
$U_n$ Antenna voltages measured on a signal that is incident on the DF array
$A_n(\theta^t, \phi^t)$ Array vectors retrieved from a calibration manifold
na number of DF antennas
wherein the term $A_n(\theta^t, \phi^t)$ and $U_n$ are summed over frequency as well and become $A_{n,f}(\theta^t, \phi^t)$ and $U_{n,f}$ and the sum is over elements (n) and frequencies (f).

Yet another embodiment of the method is wherein the chromatic CIDF algorithm can be applied to single polarization, and single line of bearing solutions and to arbitrary polarization and single line of bearing in polarization sensitive bands.

Still yet another embodiment of the method is wherein the chromatic CIDF algorithm can be applied to multiple frequencies and active radar for super resolution techniques, including, single polarization, and multiple line of bearing solutions, or arbitrary polarization, and multiple line of bearing solutions with signal separation capabilities determined by SNR and array bandwidth.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
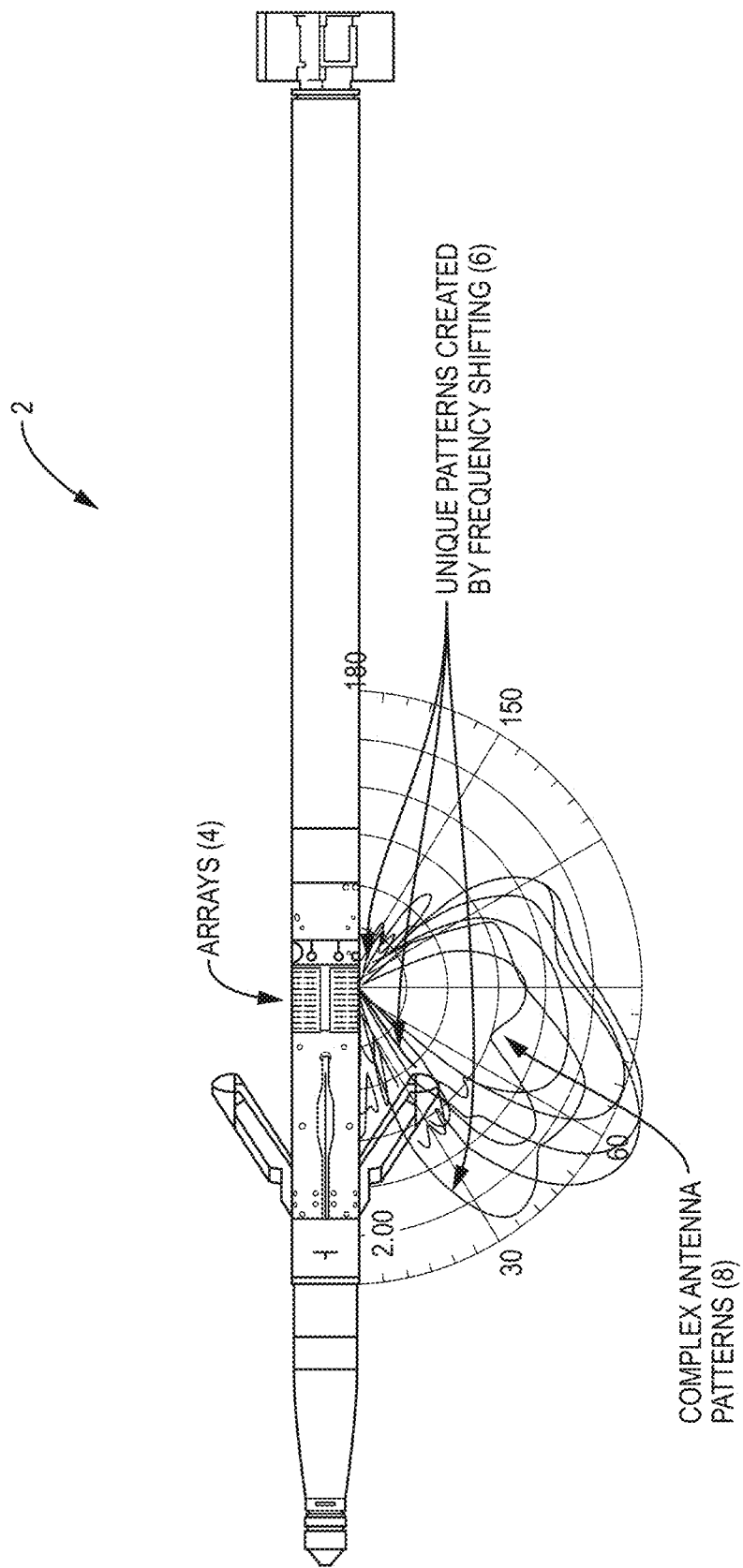
FIG. 1 is a diagram of a guided missile using chromatic correlation interferometry direction finding for missile guidance according to the principles of the present disclosure.

It has been recognized that correlation interferometry direction finding (CIDF) is the only current technique that can address complex antenna patterns. However, this approach can still contain ambiguities in location. CIDF currently does correlation with a narrow frequency. The problem with that approach is that a correlation peak can have ambiguities and these ambiguities can make guidance and tracking challenging and errors can occur. To address false peaks and improve accuracy, a multiple frequency CIDF method is used and will be described herein.

In one embodiment of the chromatic CIDF of the present disclosure, an enhancement to CIDF is used to resolve these ambiguities. This embodiment is used to overcome ambiguities by correlating over a range of frequencies. In one embodiment, an extension of CIDF uses multiple (i.e., 2 or more) frequencies or a continuous range of frequencies to make a more robust correlation manifold. Since the complex response manifold is frequency dependent, using a set of two or more manifolds provides a significant reduction of false peaks.

The present application addresses the issue of false peaks by computing $R^2$ at two or more frequency values. Thus, chromatic CIDF adds a frequency so in the correlation equation described above the term $A_n(\theta^r, \phi^r)$ and $U_n$ are summed over frequency as well and become $A_{n,f}(\theta^r, \phi^r)$ and $U_{n,f}$ and the sum is over elements (n) and frequencies (f).

In one embodiment of the present disclosure, the chromatic CIDF process is used with radar and multiple frequencies. This approach extends conventional CIDF methods by including frequency diversity and active DF (e.g., the use of radar). A goal of the chromatic CIDF approach of the present disclosure is to take existing CIDF schema and enhance it to eliminate wild bearings that arise. Wild bearings are false targets. In one embodiment of the system of the present disclosure, active radar (transmit and receive) is used where previous CIDF schema only had receiving. With the addition of a transmit option, the transmit frequency can be varied to add more discriminatory abilities to more accurately isolate targets while not isolating wild bearings or false positives.

The addition of multiple frequencies and active radar can be added to various CIDF schema, including, those with 1) single polarization, and single line of bearing (LOB) solutions; 2) arbitrary polarization and single LOB in polarization sensitive bands; 3) the addition of multiple frequencies and active radar can be added to CIDF schema for super resolution CIDF techniques, including, a) single polarization, and multiple LOBs, with signal separation capabilities determined by SNR and array bandwidth; and b) arbitrary polarization, and multiple LOBs with signal separation capabilities determined by SNR and array bandwidth. Improvement over previous CIDF methods is realized by adding frequency to the multidimensional array response manifold. This is done by summing the correlation equation over a set of frequencies as well as over each element, as described above.

Referring to FIG. 1, a diagram of a guided missile using chromatic correlation interferometry direction finding for missile guidance according to the principles of the present disclosure is shown. More specifically, a guided missile 2 is shown. Chromatic CIDF, enhances CIDF when applied to broad band applications and is used for missile guidance. This enhancement is obtained because features in the pattern change vs frequency. The spurious peaks that are not due to targets do not appear at the same angles when the frequency is changed, while true peaks remain at the same angles with changing frequency. Thus, including frequency in the correlation manifold causes the false peaks to wash out and at the same time true peaks are enhanced.

Note that CIDF and chromatic CIDF can be applied to passive targeting and active targeting. When used in active targeting (e.g., radar), the range to target is directly measured using time of flight. In a passive approach if range is needed it can be obtained from bearing change over the flight path. However, in missile guidance schemes a range to target is generally not required.

Because aerodynamic constraints require the antenna elements to be conformal to the missile body it is not possible to form patterns that are useful for conventional monopulse methods. Still referring to FIG. 1, a guided missile 2 is shown having multiple (typically four to eight) body conformal slotted antenna arrays 4, which produce complex antenna patterns 8. These slotted arrays aim radially out from the missile axis. Each slotted array (12 slots in this case) produces an antenna pattern which has an amplitude response that changes as frequency is changed. The phase response (not shown) also changes vs frequency. In certain embodiment, the slot elements are weighted so that the pattern is directed forward, however, the pattern is still not effective for monopulse processing. The missile includes RF hardware that is connected to the antennas. The hardware, by a process of amplification and down conversion and sampling produces I and Q samples for each antenna. These I and Q samples are input to an onboard processor and the processor executes the chromatic CIDF algorithm. The result of the algorithm is a correlation map which contains peaks that define target location(s). A peak picking algorithm obtains a set of target bearings from the correlation map and provides this set of bearing angles to the guidance and control processing.

Figure 2:
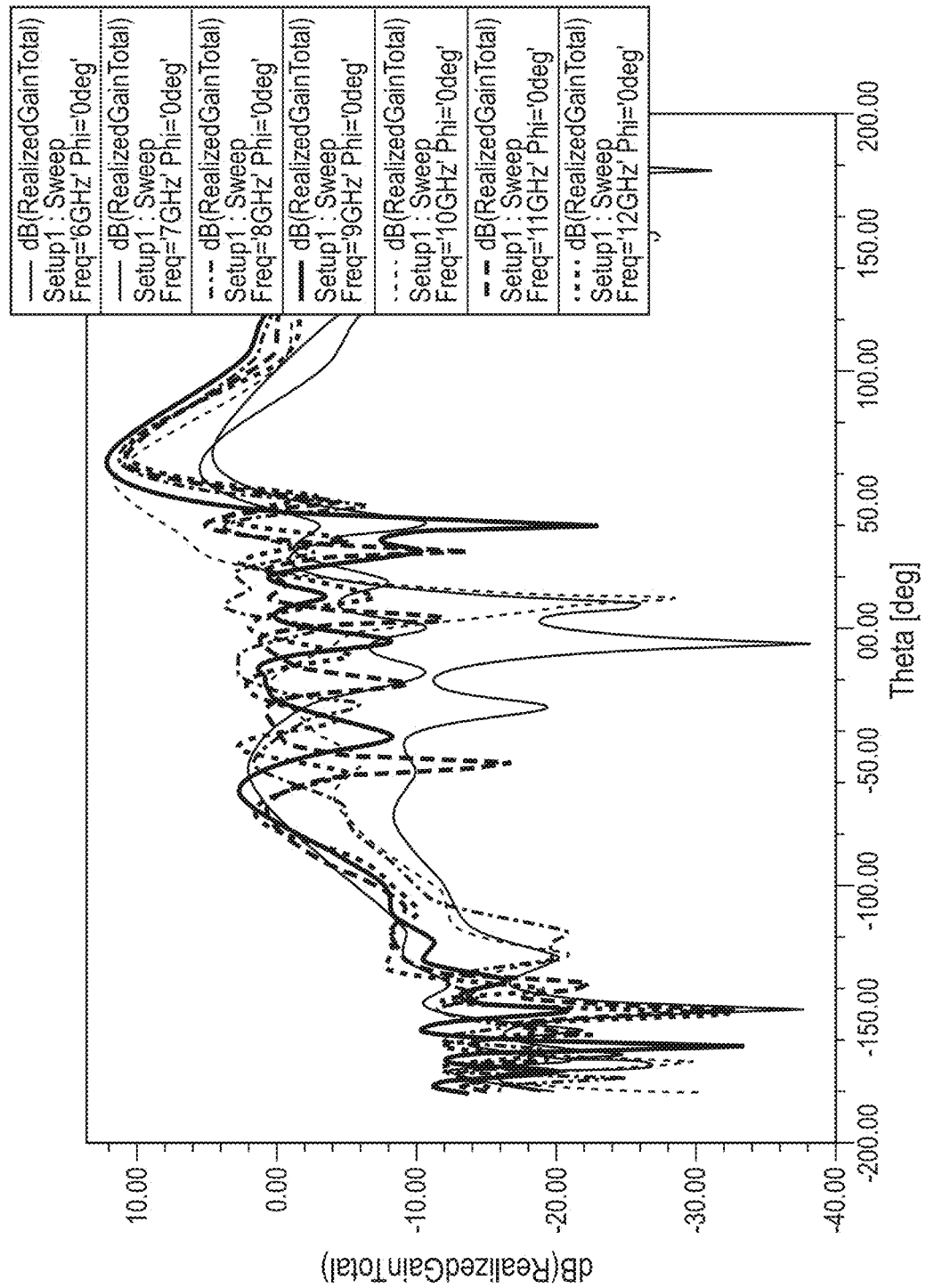
FIG. 2 is a plot of realized gain across frequencies according to one embodiment of chromatic correlation interferometry direction finding for missile guidance of the present disclosure.

Referring to FIG. 2, a plot of realized gain across frequencies for antennas that are used in one embodiment of chromatic correlation interferometry direction finding for missile guidance of the present disclosure is shown. As seen in the figure the pattern for each frequency has a complex shape with many peaks and nulls. This complex structure in the pattern, would render monopulse processing ineffective for this type of body conformal antenna arrays. FIG. 2 also shows that the peaks and nulls change with frequency. The chromatic CIDF process can exploit the structure in the patterns as well as the changes that occur vs frequency. In contrast, monopulse methods would be ineffective with such patterns. Finally, not shown in the figure is the phase response. As in the amplitude response, the phase map is angle and frequency dependent. Both amplitude and phase information are used by the chromatic CIDF process since I and Q data (complex data) is used in the correlation process.

Figure 3:
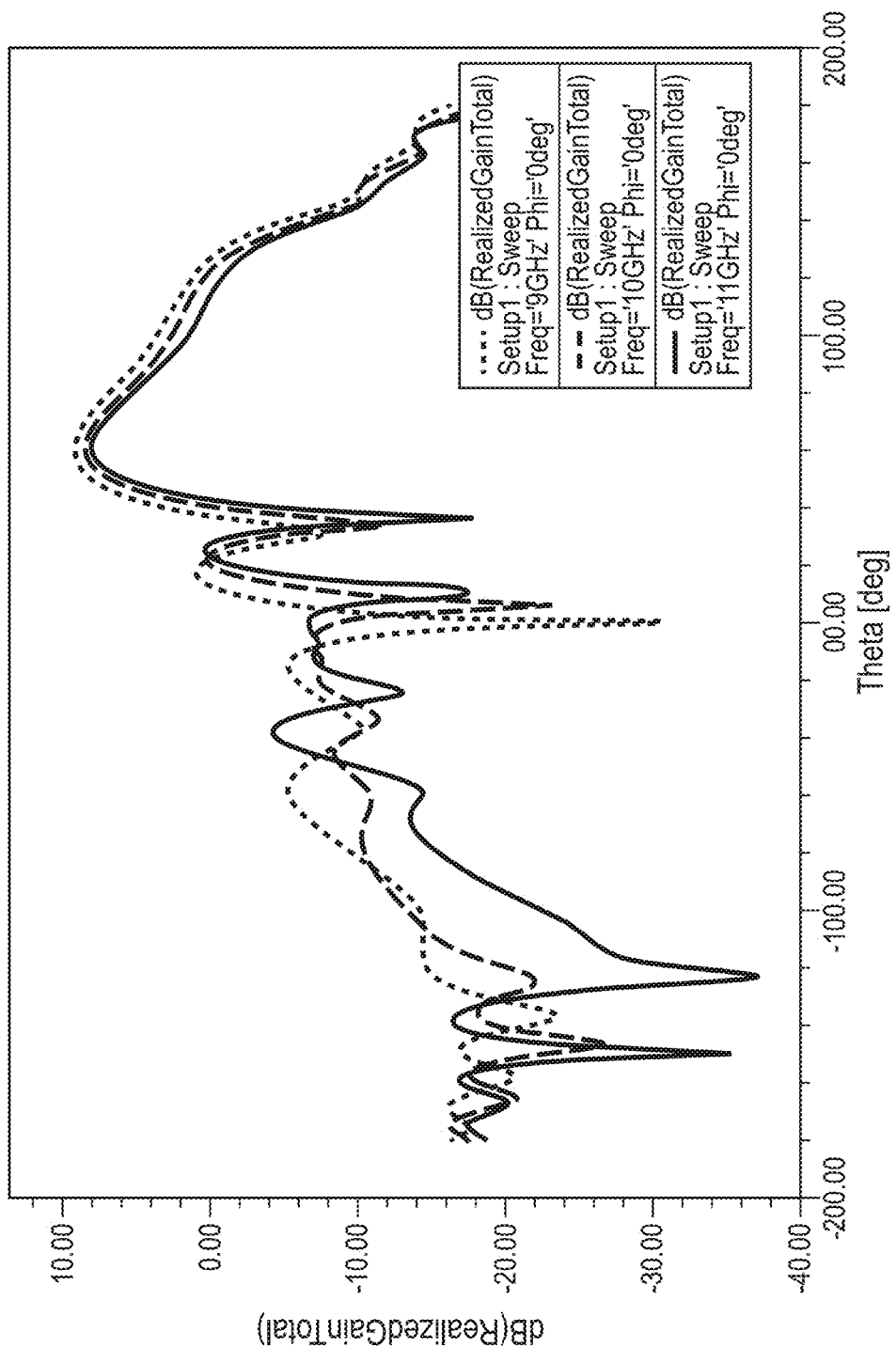
FIG. 3 is a plot of realized gain across a subset of frequencies according to one embodiment of chromatic correlation interferometry direction finding for missile guidance of the present disclosure.

Referring to FIG. 3, a plot of realized gain across a subset of frequencies according to one embodiment of chromatic correlation interferometry direction finding for missile guidance of the present disclosure is shown. More specifically, it is important to note that the shape differs for each frequency. The frequency range selected (9 to 11 GHz) provides significant differences in shapes as seen in the figure. The difference in shapes sharpen the correlation peaks and reduce or eliminate peaks that do not represent true targets. This benefit is realized with a 2 GHz band (9 to 11 GHz).

The fractional bandwidth is easily obtained by slotted arrays and many other antenna designs. In addition, it is important that the antenna response includes phase as well as amplitude and that the phase responses differ at different frequencies as well. Chromatic CIDF takes advantage of how the pattern changes over frequency shifts. A correlation surface is more unique and better defines the angle of arrival with lobe ambiguities. The benefit of this is due to the fact that the structures that do not directly represent the target shift position at a different rate for each frequency, but true targets all change at the same rate. This effect washes out the false correlation peaks and at the same time enhances peaks that correspond to true RF sources or target reflections.

Figures 4A, 4B:
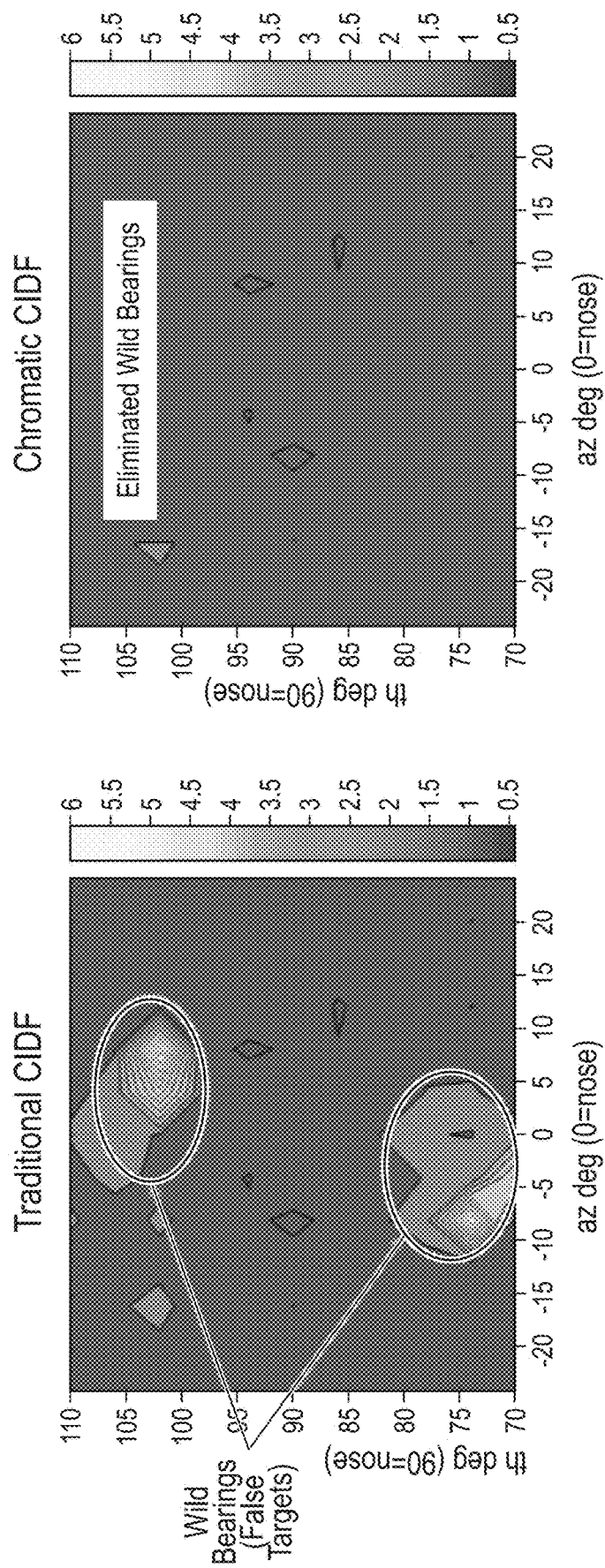
FIG. 4A shows a heat map (correlation function) obtained using a traditional CIDF approach.
FIG. 4B shows a heat map (correlation function) when a multiple frequency correlation is used.

Referring to FIG. 4A, a heat map (correlation function) obtained using a traditional CIDF approach is shown. More specifically, there are three real targets. However, the correlation function using a single frequency shows false targets. This can lead to undesired results. Referring to FIG. 4B, a heat map (correlation function) when a multiple frequency correlation is used is shown. In this case, the false targets are not present and only the three actual targets show up in the correlation surface.

Figure 5:
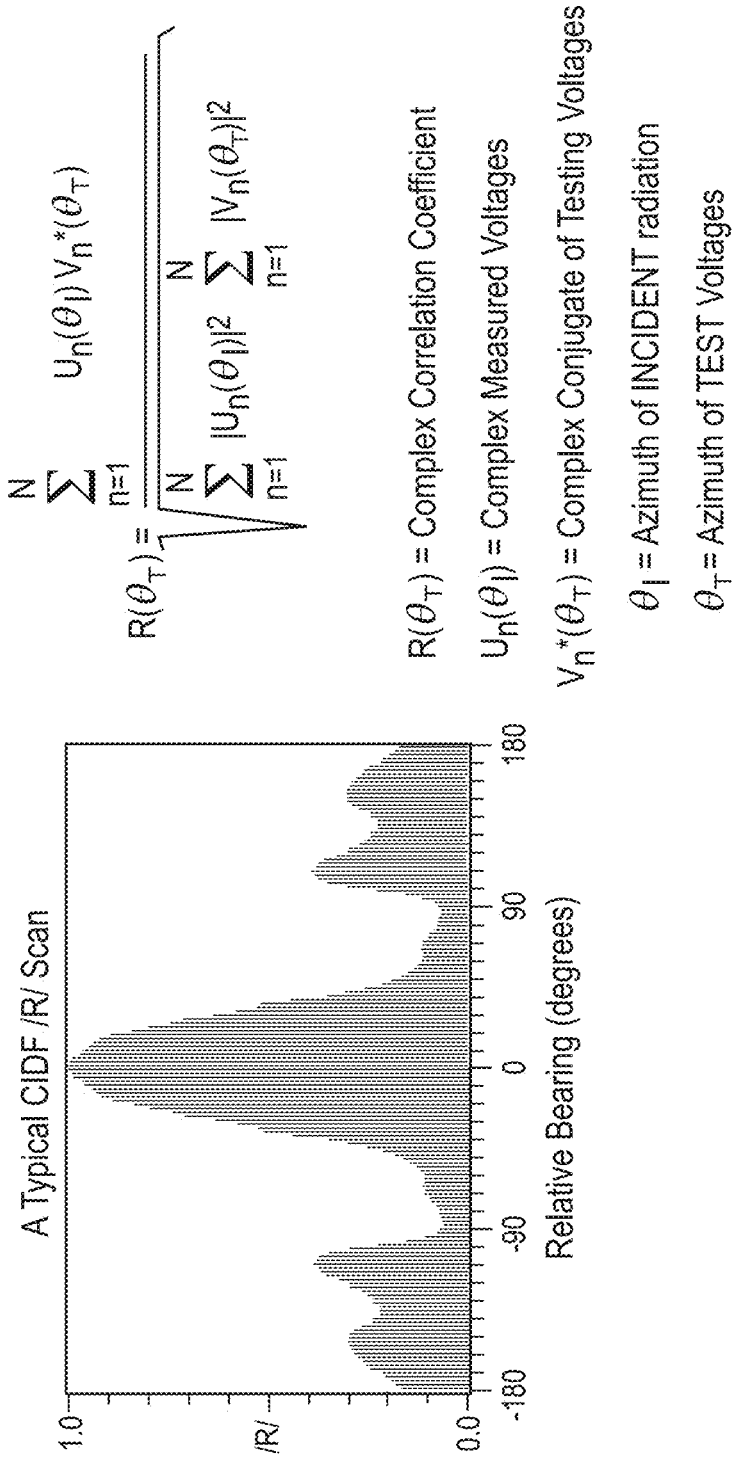
FIG. 5 describes a method of using correlation interferometry direction finding to determine angle of arrival (AOA).

Referring to FIG. 5, a method of using CIDF to calculate AOA (angle of arrival) is shown. More specifically, the AOA is associated with the best match (maximum correlation) between measured and stored complex antenna voltages. The exact azimuth is found using parabolic interpretation between peak and adjacent azimuth bins.

Figure 6:
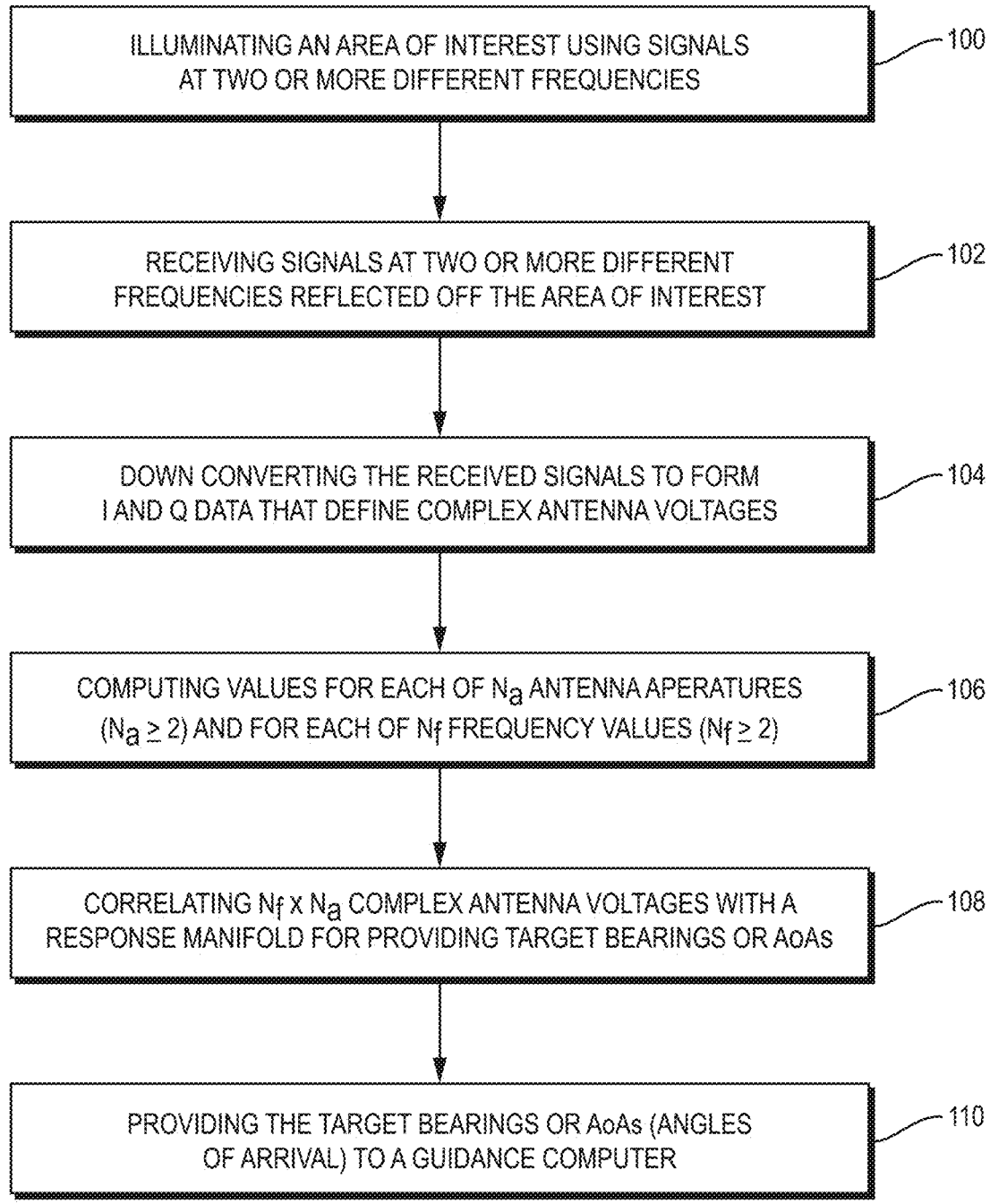
FIG. 6 is a flowchart of one embodiment of a method of using chromatic correlation interferometry direction finding according to the principles of the present disclosure.

Referring to FIG. 6, a flowchart of one embodiment of a method of using chromatic correlation interferometry direction finding according to the principles of the present disclosure is shown. More specifically, a method for chromatic correlation interferometry direction finding (CIDF), comprises illuminating an area of interest using signals at two or more different frequencies (100), and receiving signals at two or more different frequencies reflected off the area of interest (102). Then, the received signals are down converted to form I and Q data that defines complex antenna voltages (104). Values for each of $N_a$ antenna apertures ($N_a \geq 2$) and for each of $N_f$ frequency values ($N_f \geq 2$) are computed (106). A plurality of $N_f \times N_a$ complex antenna voltages are correlated with a data table (e.g., a pre-calibrated or pre-measured response manifold) where the data table provides peaks that represent target bearings or angles of arrival (108). The target bearings or angles of arrival may then be provided to a guidance computer (110) for use in navigation and/or targeting.

The chromatic CIDF process is a combination of hardware data collection followed by processing. Depending on the details of the hardware the data collection can be done in parallel or can be done in a sequence using commutation. Thus, for example in one embodiment if the system has eight (8) slotted arrays and eight (8) RF channels, a set of N steps are needed to collect data for N frequencies. This could even be done in one step if the RF hardware can operate on M frequency channel. At the other extreme, the data could be collected in 8× N steps. Once the data is collected the multi-frequency correlation function is computed. Then a peak search is done to provide the location(s) of targets. In a missile these locations are provided to flight processing which then selects which target to pursue.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the present disclosure may be implemented as computer software, which may be supplied on a storage medium or via a transmission medium such as a local-area network or a wide-area network, such as the Internet. It is to be further understood that because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for chromatic correlation interferometry direction finding (CIDF), comprising:
    a transmitter configured to transmit signals at two or more frequencies;
    a set of two or more antenna elements for receiving the signals;
    signaling hardware configured to form I and Q data from the received signals;
    a processor to control the signaling hardware and execute a chromatic CIDF algorithm, wherein the chromatic CIDF algorithm is:

$$|R(\theta^t, \phi^t)|^2 = \frac{\left|\sum_1^{na} U_n A_n^*(\theta^t, \phi^t)\right|^2}{\left(\sum_1^{na} |U_n|^2\right)\left(\sum_1^{na} |A_n(\theta^t, \phi^t)|^2\right)}$$

where:
    $|R(\theta^t, \phi^t)|^2$ Is the correlation squared function computed at testing angles $(\theta^t, \phi^t)$
    $U_n$ Antenna voltages measured on a signal that is incident on the DF array
    $A_n(\theta^t, \phi^t)$ Array vectors retrieved from a calibration manifold
    na number of DF antennas
wherein the term $A_n(\theta^t, \phi^t)$ and $U_n$ are summed over frequency as well and become $A_{n,f}(\theta^t, \phi^t)$ and $U_{n,f}$ and the sum is over elements (n) and frequencies (f); and
    a pre-measured or pre-calibrated response manifold, or data table, for use in comparing with the received signals.

2. The system of claim 1, wherein the signals are radar signals.

3. The system of claim 2, wherein the radar signals are time of flight.

4. The system of claim 1, wherein the chromatic CIDF algorithm can be applied to single polarization, and single line of bearing solutions and to arbitrary polarization and single line of bearing in polarization sensitive bands.

5. The system of claim 1, wherein the chromatic CIDF algorithm can be applied to multiple frequencies and active radar for super resolution techniques, including, single polarization, and multiple line of bearing solutions, or arbitrary polarization, and multiple line of bearing solutions with signal separation capabilities determined by SNR and array bandwidth.

6. A method for chromatic correlation interferometry direction finding (CIDF), comprising:
    illuminating an area of interest using signals at two or more different frequencies;
    receiving the signals at two or more different frequencies reflected off the area of interest;
    down converting the received signals to form I and Q data that define complex antenna voltages;
    computing values for each of $N_a$ antenna apertures ($N_a \geq 2$) and for each of $N_f$ frequency values ($N_f \geq 2$);
    correlating $N_f \times N_a$ complex antenna voltages with a pre-calibrated or pre-measured response manifold, where the pre-calibrated or pre-measured response manifold provides peaks that represent target bearings or angles of arrival;
    providing the target bearings or angles of arrival to a guidance computer; and
    executing a chromatic CIDF algorithm;

$$|R(\theta^t, \phi^t)|^2 = \frac{\left|\sum_1^{na} U_n A_n^*(\theta^t, \phi^t)\right|^2}{\left(\sum_1^{na} |U_n|^2\right)\left(\sum_1^{na} |A_n(\theta^t, \phi^t)|^2\right)}$$

where:
    $|R(\theta^t, \phi^t)|^2$ Is the correlation squared function computed at testing angles $(\theta^t, \phi^t)$
    $U_n$ Antenna voltages measured on a signal that is incident on the DF array
    $A_n(\theta^t, \phi^t)$ Array vectors retrieved from a calibration manifold
    na number of DF antennas
wherein the term $A_n(\theta^t, \phi^t)$ and $U_n$ are summed over frequency as well and become $A_{n,f}(\theta^t, \phi^t)$ and $U_{n,f}$ and the sum is over elements (n) and frequencies (f).

7. The method of claim 6, further comprising using changes in an array pattern as a function of a frequency response to resolve ambiguous peaks that are present in an array pattern of a single frequency.

8. The method of claim 6, wherein the signals are radar signals.

9. The method of claim 8, wherein the radar signals are time of flight.

10. The method of claim 6, wherein the chromatic CIDF algorithm can be applied to single polarization, and single line of bearing solutions and to arbitrary polarization and single line of bearing in polarization sensitive bands.

11. The method of claim 6, wherein the chromatic CIDF algorithm can be applied to multiple frequencies and active radar for super resolution techniques, including, single polarization, and multiple line of bearing solutions, or arbitrary polarization, and multiple line of bearing solutions with signal separation capabilities determined by SNR and array bandwidth.

12. The method of claim 8, wherein the radar signals provide increased resolution direction finding and decreased sidelobes.

13. The method of claim 8, wherein the radar signals provide a range to target in addition to target bearing angles.

14. A method for chromatic correlation interferometry direction finding (CIDF), comprising:
    receiving signals at two or more different frequencies reflected off an area of interest;
    down converting the received signals to form I and Q data that define complex antenna voltages;
    computing values for each of $N_a$ antenna apertures ($N_a \geq 2$) and for each of $N_f$ frequency values ($N_f \geq 2$);
    correlating $N_f \times N_a$ complex antenna voltages with a pre-calibrated or pre-measured response manifold, where the pre-calibrated or pre-measured response manifold provides peaks that represent target bearings or angles of arrival;
    providing the target bearings or angles of arrival to a guidance computer; and
    executing a chromatic CIDF algorithm:

$$|R(\theta^t, \phi^t)|^2 = \frac{\left|\sum_1^{na} U_n A_n^*(\theta^t, \phi^t)\right|^2}{\left(\sum_1^{na} |U_n|^2\right)\left(\sum_1^{na} |A_n(\theta^t, \phi^t)|^2\right)}$$

where:
- $|R(\theta^t, \phi^t)|^2$ Is the correlation squared function computed at testing angles $(\theta^t, \phi^t)$
- $U_n$ Antenna voltages measured on a signal that is incident on the DF array
- $A_n(\theta^t, \phi^t)$ Array vectors retrieved from a calibration manifold
- na number of DF antennas wherein the term $A_n(\theta^t, \phi^t)$ and $U_n$ are summed over frequency as well and become $A_{n,f}(\theta^t, \phi^t)$ and $U_{n,f}$ and the sum is over elements (n) and frequencies (f).

15. The method of claim 14, wherein the signals are radar signals.

16. The method of claim 14, wherein the chromatic CIDF algorithm can be applied to single polarization, and single line of bearing solutions and to arbitrary polarization and single line of bearing in polarization sensitive bands.

17. The method of claim 14, wherein the chromatic CIDF algorithm can be applied to multiple frequencies and active radar for super resolution techniques, including, single polarization, and multiple line of bearing solutions, or arbitrary polarization, and multiple line of bearing solutions with signal separation capabilities determined by SNR and array bandwidth.

* * * * *